Feb. 2, 1932.  A. DINA  1,843,544
APERTURE PLATE AND MECHANISM FOR MOTION PICTURE PROJECTION MACHINES
Filed Sept. 30, 1929  3 Sheets-Sheet 1
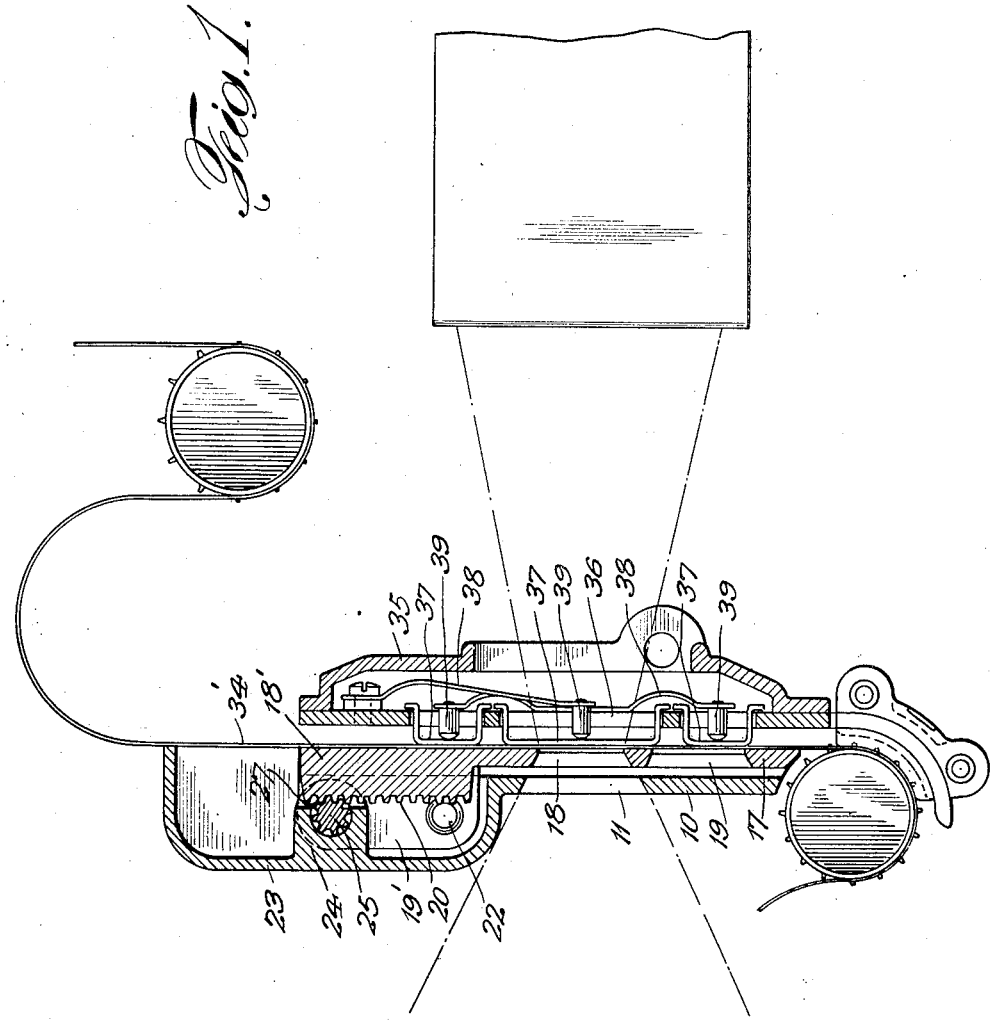
INVENTOR
Augusto Dina
BY
Howard W. Fit
ATTORNEY Feb. 2, 1932.  A. DINA  1,843,544
APERTURE PLATE AND MECHANISM FOR MOTION PICTURE PROJECTION MACHINES
Filed Sept. 30, 1929  3 Sheets-Sheet 2
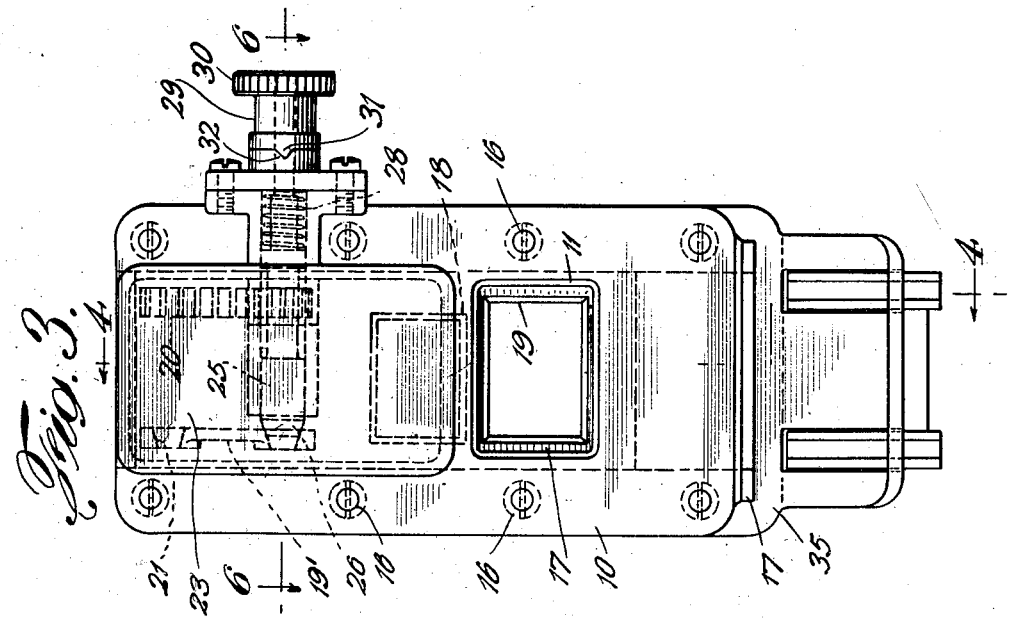
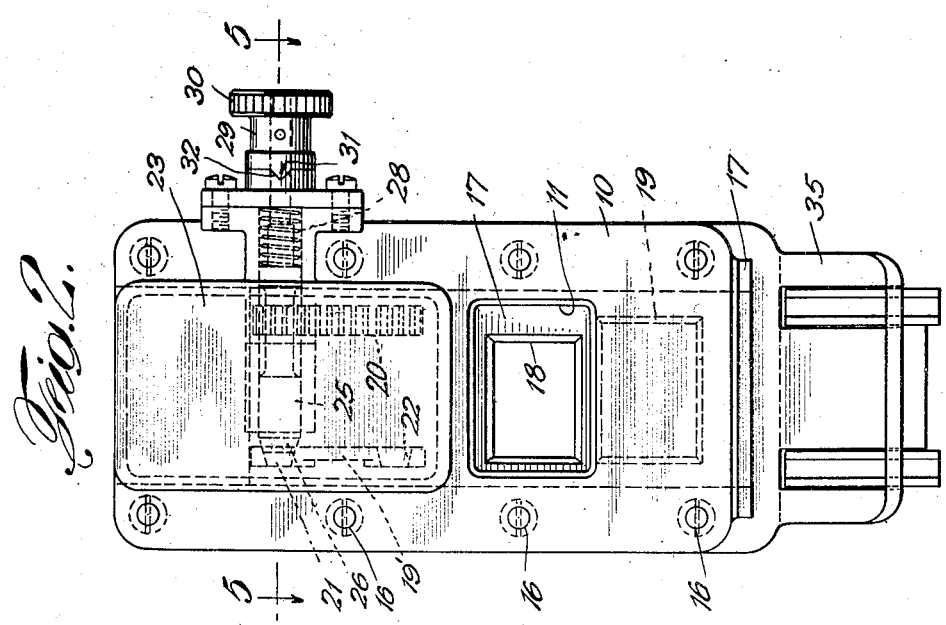
INVENTOR
Augusto Dina
BY
Howard W. D. t
ATTORNEY

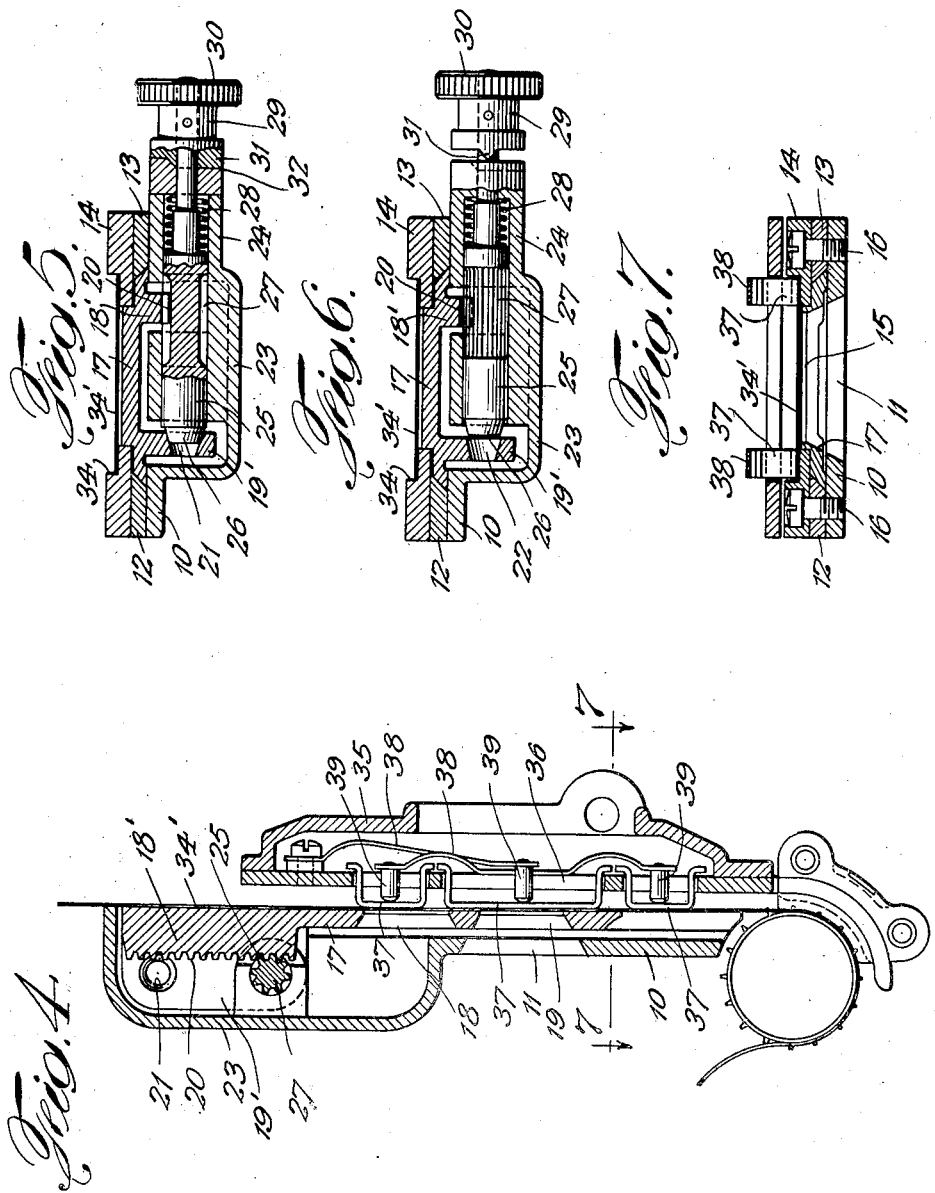

Patented Feb. 2, 1932

1,843,544

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

APERTURE PLATE AND MECHANISM FOR MOTION PICTURE PROJECTION MACHINES

Application filed September 30, 1929. Serial No. 396,038.

This invention relates to motion picture apparatus and has particular reference to new and useful improvements in aperture opening plates for projectors.

A main object of the invention is to provide a simple, compact aperture opening plate provided with means improved so that the character of the opening may be easily and quickly varied to adapt it to the projection of standard films or to movie-tone film without a seconds waste time.

A further object is to provide a simple, novel, and durable mechanism whereby such a change in the character of the opening may be made instantly and the respective openings presented in absolutely accurate alinement with the normal line of projection.

A still further object is to provide such a mechanism that the above change in the character of the opening may be made with a simple quick flick of the fingers of the operator with positive assurance that with one turn or a part turn of the mechanism, the parts will be quickly moved and locked in accurate alined operative position.

Yet another object is to provide a simple and efficient film trap door which is constructed to provide a simple and sure pressure on the film at the proper points when the door is in position against its cooperating member such as a film gate.

Further and more specific objects, features, and advantages will more clearly appear from the detailed description given below when taken in connection with the accompanying drawings which form part of the specification and which illustrate one preferred form of the invention.

In its general aspect, the invention is particularly concerned with a film aperture construction which is adapted to be operated in connection with machines constructed to use either the standard film or the movie-tone film which has striata along one edge as is well known. In order to project the movietone film it is necessary under these conditions, to employ a modified aperture opening so that the striata will not be projected upon the screen as would be the case if the standard full size opening were employed. To this end, therefore, the invention embodies a support which may be in the form of a gate plate having the standard aperture therein, and, preferably on this support or gate is mounted a slide plate provided with two openings therein. One of these openings is of the standard size and the other is of a proper size to adapt it for use with a movie-tone film.

When the same reel may have ordinary standard sections interspersed with movietone sections, it is clearly seen that it becomes very necessary to change over very quickly from one style of opening to the other and it is especially important that this change be made with absolute accuracy since it is very important that when one of the slide openings is moved into position, that it be exactly alined with the optical axis for the proper projection. It is part of the present invention to provide a simple hand knob which can be quickly manipulated by the fingers of one hand to move the slide plate from one position to the other with a simple twist of the fingers and provide latching mechanism on the turning or moving mechanism which will automatically bring the slide plate into one or the other of two or more positions with absolute accuracy so that the proper openings are exactly alined. It is also part of the invention that the moving mechanism can be operated by a continuous motion of the fingers in one direction to move the slide plate in any given direction. In addition, the plate becomes automatically locked in either of its extreme positions.

The present preferred form of the invention is shown in the drawings of which,

Fig. 1 is a vertical longitudinal section through the support and trap door showing the slide plate in one position;

Fig. 2 is a front elevation of the apparatus with the parts in the same position;

Fig. 3 is a similar elevation showing the slide plate in another position;

Fig. 4 is a vertical longitudinal section showing the slide plate in the position illustrated in Fig. 3;

Fig. 5 is a horizontal cross section taken on the line 5—5 of Fig. 2;

Fig. 6 is a similar section taken on the line 6—6 of Fig. 3; and

Fig. 7 is a similar cross section taken on the line 7—7 of Fig. 4.

As shown in the drawings, the present preferred form of the invention comprises a support forming part of the projection head of the projector and which may comprise a front plate 10 with aperture 11 therein, intermediate lateral bevelled strips 12 and 13 (Fig. 7), and a back plate 14 with aperture 15 therein all held together by suitable means such as screws 16 (Fig. 7). These three elements thus held together to form a support may be the usual gate plate of the machine or may be any other suitable support with the aperture openings 11 and 15 therein alined and through which the projection beam passes. On the support thus described and between the lateral strips 12 and 13 there is disposed to slide vertically along the plate 10, a slide plate 17, the edges of which are provided with a bevel corresponding to the bevels on the strips 12 and 13. This slide plate 17 moves vertically between the front plate 10 and the back plate 14 as shown in Figs. 5, 6, and 7. This slide plate 17 is provided along its lower portion with two spaced aperture openings therein 18 and 19 one of which is a standard opening and the other of which is modified as to its width to provide a movie-tone opening.

The upper end of the slide plate 17 is provided with spaced outwardly extending flanges such as 18' and 19' one of which is provided with rack teeth 20 thereon and the other of which is formed with spaced bevelled holes such as 21 and 22. These flanges project into a chamber formed by an enlarged portion 23 at the upper end of the support such as the gate plate shown in Figs. 1 and 4. Within this chamber there is formed and supported a bearing sleeve 24 within the bore of which is disposed a shaft 25 one end of which such as 26 is tapered to fit into the tapered holes 21 and 22 of the flange 19' when projected thereinto. Intermediate its length the shaft 25 is formed with gear teeth 27 to engage the teeth 20 on the rack on the flange 18'. The shaft 25 at its other end is reduced in diameter to provide a chamber in which lies spring 28 which tends to force the shaft 25 to the left at all times. The extreme end of the shaft 25 extends without the sleeve 24 and thereon is fixed a hub 29 with a hand knob 30 to permit the shaft 25 to be turned. The inner face of the hub 29 is provided with an inwardly projecting tongue 31 which is adapted to project into a similarly shaped notch 32 on the adjacent face of the end of the sleeve 24.

The back of the plate 14 is provided with a shallow recess 33 in which the film 34 lies. Pressing against the film 34 is the usual trap door 35 having the beam aperture opening 36 therein. The door 35 is moved into the operative position by any suitable mechanism not shown. Mounted loosely on the door is a plurality of spring strips such as 37 which have the shape of a U and with the base thereof lying along the front face of the door along the sides thereof to press against the film and with the legs of the U passing through slots in the door and bent around at the ends thereof. Springs such as 38 with pins 39 on their ends are disposed on the back of the door and the pins 39 bear against the rear of the U base of the strips 37 to press them against the film as shown in Figs. 1 and 4.

*Operation*

With the parts in the position shown in Fig. 1, it will be observed that the slide plate 17 is in its lowermost position in which the aperture 18 is disposed in line with the optical axis and permits projection therethrough. This aperture 18 is the modified aperture adapted to permit projection of the movie-tone films. It will be seen that this aperture 18 is accurately alined with the optical axis and the apertures in the support such as the gate plate and at the same time the tongue 31 is nested in the notch 32 so that the shaft 25 and therefore the slide plate 17 is securely latched against movement. When the standard picture film is to be projected then the knob 30 is turned in a given direction to move the shaft 25 around and through the gear teeth 27 to move the slide plate 17 and the aperture 19 into the position before the aperture in the support such as the gate plate and in alinement therewith. The parts are all so synchronized as to their dimensions and times of movements that when the aperture 19 gets in the proper position before the optical axis, then the tongue 31 is again nested in the notch 32 so that the shaft 25 is automatically latched in position.

It will also be noted that when the slide plate is in its two extreme operative positions, the holes 21 and 22 are in line respectively with the bevelled end of the shaft 25 and the spring 28 will force the end of the shaft into these holes to further hold the slide plate in position. The slope of the bevel engagement between the end of the shaft 25 and the holes 21 and 22 is different from the slope of the engagement between the tongue 31 and the notch, 32, and the slope of the latter engagement is at a trifle greater pitch than the other so that when the knob 30 begins to turn, the shaft 25 will be drawn out of the holes 21 and 22 sufficiently in advance of movement of the slide plate 17 that there will be no binding at these points.

This simple, compact, and efficient device furnishes a construction in which, by the mere flip of the fingers, the slide plate may be moved from one position to another with speed, and be latched in either operative position with absolute accuracy relative to the aperture opening in the support such as the gate plate or similar elements and with the optical axis. It will be noted that on the commencement of the turning movement of the knob 30, the first action is that the shaft 25 is drawn to the right to withdraw it from the corresponding hole in the flange 19′ and without binding in this movement. This results from the action of the tongue 31 on the notch 32. Further movement of the knob 30 in the same direction will continue the movement of the slide plate 17 and shift the plate from one position to the other. When this other position is reached the shaft again slips to the left and is pushed into the proper hole in the flange 19′ by the spring 28 at the same time that the tongue 31 drops into the notch 32. Thus in each extreme position the shaft is locked to the slide plate 17 and the support such as the gate plate. In other words the turning member is locked not only to its support but also to the element which it is driving and in between the two extreme positions the turning member is free of such locking engagement to effect its proper turning function. All this takes place with a uni-directional movement on the part of the knob 30 so that the operator has the very simplest sort of a movement to work with. The latching of the parts is practically automatic.

While the invention has been described in detail and with respect to a preferred form thereof, it is to be understood that it is not to be limited to such details and forms since many changes and modifications may be made and the invention embodied in other forms without departing from the spirit and scope of the invention in its broader aspects. Hence it is now desired to cover all forms and modifications coming within the language or scope of any one or more of the appended claims.

What is claimed is:

1. In a motion picture machine, a slidable aperture plate having a plurality of openings of different sizes, a support, means on the support to move the aperture plate to a plurality of predetermined positions, cooperating means on the plate engaged by said moving means and means on the aperture plate to engage and latch the moving means when the aperture plate has been moved to any of said positions, and spring means on the support engaging the moving means to move it into engagement with said latching means when the aperture plate has been moved to any one of the predetermined positions.

2. In a motion picture machine, a slidable aperture plate having a plurality of openings of different sizes, a support, a turnable member on the support, means on the aperture plate co-operating therewith to move the aperture plate, means for turning said member to move the aperture plate to a plurality of predetermined positions, and means on the aperture plate to engage and latch the member thereto when the aperture plate has arrived at any of its predetermined positions.

3. In a motion picture machine, a slidable aperture plate having a plurality of openings of different sizes, a support, a turnable member on the support, means on the aperture plate co-operating therewith to move the aperture plate, means for turning said member to move the aperture plate to a plurality of predetermined positions, means on the aperture plate to engage and latch the member thereto when the aperture plate has arrived at any of its predetermined positions, means for laterally shifting said member to disengage it from the aperture plate when desired.

4. In a motion picture machine, a support, a slidable aperture plate thereon having a plurality of openings of different sizes, a gear shaft on the support, a gear rack on the slide plate meshing therewith, means for turning the shaft to move the slide plate to a plurality of predetermined positions, one end of the shaft being tapered, the slide plate having a plurality of tapered holes therein at predetermined points, means permitting the lateral movement of the shaft to enter the tapered holes in the slide plate when the shaft has turned the slide plate to one or the other of its predetermined positions, and means on the support to withdraw the shaft from the holes except when the slide plate is in one or the other of these predetermined positions.

5. In a motion picture machine, a support, a slidable aperture plate thereon having a plurality of openings of different sizes, a gear shaft on the support, a gear rack on the slide plate meshing therewith, a flange on the slide plate having a plurality of spaced tapered apertures therein, the end of the gear shaft being tapered, a spring tending to move the shaft toward the tapered apertures in the slide plate, a tongue on the shaft, said support, having a recess in which said tongue is adapted to lie in certain angular positions of the shaft, the shaft adapted to be moved by the spring to enter one of the tapered holes when the tongue is nested in the recess, said nesting and engagement occurring only when the slide plate has arrived at predetermined positions.

6. In a motion picture machine, a slidable aperture plate having a plurality of openings of different sizes, a support, a shaft on the support, means co-operating with the shaft to move the aperture plate when the shaft is turned, means for latching the shaft to the support when the aperture plate has been moved to predetermined positions, and means for latching a portion of the shaft to the aperture plate in any of these predetermined positions, the engagement of the shaft with the support allowing the movement of the aperture plate in either direction by a single continuous movement of the shaft angularly in one direction or another, and means for causing the latching actions above mentioned to take place automatically upon the arrival of the aperture plate in the predetermined positions.

7. In a motion picture machine, a slidable aperture plate having a plurality of openings of different sizes, a support, a shaft on said support, means on the aperture plate co-operating with the shaft for movement of the aperture plate, means for latching the shaft to the support and the aperture plate in predetermined positions of the aperture plate, and means requiring the unlatching of the shaft from the support and plate at the beginning of a uni-directional movement of the shaft in either direction from the latched position.

8. In a motion picture machine, a slidable aperture plate having a plurality of openings of different sizes, a support, a shaft on said support, means on the aperture plate co-operating with the shaft for movement of the aperture plate, means for latching the shaft to the aperture plate and means for latching the shaft to the support in predetermined positions of the aperture plate, means for unlatching the shaft from the support and the aperture plate at the beginning of a uni-directional movement of the shaft in either direction from the normal position, and means for automatically latching the shaft to the aperture plate and support when the aperture plate has been moved to the end of its travel to a predetermined position.

9. In a motion picture machine, a support, a slidable aperture plate thereon having a plurality of openings of different sizes, a single means for moving the slide plate to one or another extreme position on the support by a continuous turning movement of the moving means in a given direction or another, means for latching the moving means to the aperture plate in the extreme positions of the plate and means for unlatching the moving means at the beginning of its movement and latching it at the end of its movement without varying the single uni-directional nature of its movement.

10. In a motion picture machine, a slidable aperture plate having a plurality of openings of different sizes, a support for said aperture plate, a shaft on the support and means connecting the shaft to the plate to move the plate from one position to another by a single uni-directional movement of the shaft in one direction or another, means for latching the shaft to the support in predetermined positions of the aperture plate, means for latching the shaft to the aperture plate in said predetermined positions, and means whereby the latching and unlatching of the shaft and the movement of the aperture plate is effected by the single continuous movement of the shaft in one direction or the other.

11. In a motion picture machine, a support, a slidable aperture plate thereon having a plurality of openings of different sizes, a shaft on the support and connected to the slide plate, the end of the shaft being tapered, and receivable in tapered holes in the slide plate, a tongue on the shaft receivable in a notch on the support, the taper of the holes and the shaft end being less than the taper of the tongue and the notch, spring means for keeping these tapered parts in engagement, the parts being disengaged by a single continuous turning movement of the shaft.

This specification signed this 27th day of September, 1929.

AUGUSTO DINA.